May 27, 1958 — A. L. ARMENTROUT — 2,836,555
MATERIAL FOR RECOVERING LOST CIRCULATION IN WELLS
Filed July 30, 1956

ARTHUR L. ARMENTROUT
INVENTOR.

BY Hazard & Miller
ATTORNEYS

United States Patent Office 2,836,555
Patented May 27, 1958

2,836,555

MATERIAL FOR RECOVERING LOST CIRCULATION IN WELLS

Arthur L. Armentrout, Long Beach, Calif.

Application July 30, 1956, Serial No. 600,855

7 Claims. (Cl. 252—8.5)

This invention relates to a material highly suitable for use in recovering lost circulation in drilling of wells by means of a rotary well drilling apparatus. The material may also be advantageously used in performing cementing operations in cementing wells.

This application is a continuation-in-part of my co-pending application Serial No. 367,029, filed July 9, 1953, now abandoned.

In drilling wells by means of a rotary well drilling apparatus the well bore frequently traverses a stratum which is cracked or has crevices and interstices therein through which the rotary drilling mud that is discharged from the drill string escapes. Under such circumstances it is necessary to plug or close such crevices or interstices against continued or excessive loss of the rotary drilling mud, and for this purpose compressed, dried, or dehydrated, expandable type bentonite clay is highly suitable for the reason that when this material is in granular or pellet form and is exposed to water, it will absorb water and expand to a size many times its original volume. When thus expanded it remains in its expanded condition as long as the material remains damp. Consequently, if the bentonite clay can be delivered from the surface into the crevice or interstices in its dried or dehydrated condition or substantially so, and then wetted or exposed to water and allowed to expand in the cranks and crevices, the expansible type bentonite clay will form a highly satisfactory plug closing the cracks and crevices against further escape of drilling mud.

I have heretofore proposed to recover lost circulation in the drilling of oil wells by compressing dried or dehydrated expandable bentonite clay into pellet form and feeding the pellets into the circulation fluid that is pumped down the drill stem. The highly compressed condition and the pellet form contribute to a delay of water absorption by the clay so that the pellets may be carried to the cracks or crevices before the centers of the pellets have been completely wetted by the water in the drilling mud. The centers of the pellets consequently may reach the cracks or crevices and become lodged therein after which they may continue to absorb water and expand and thus lock themselves in place.

I have also proposed coating such granules or pellets with a water soluble coating which would require some interval of time to dissolve. Such coated granules or pellets have been introduced where circulation was being lost and the slowly soluble coating would afford a time-delay in exposing the bentonite clay to the water so that the expansion of the bentonite would be delayed until the granules or pellets had become lodged in the cracks and crevices.

In the case of very deep wells a still longer time may be required to allow the drilling fluid to carry the granules or pellets to the location where circulation fluid is being lost, and an object of the present invention is to provide a novel material wherein the absorption of water by the expansible type bentonite clay can be delayed until the granules or pellets have reached or have nearly reached the location where circulation is being lost. Ultimately, however, the bentonite clay will be released and exposed to the water in the drilling mud and upon absorbing it the clay will expand materially and thus efficiently plug the fissures through which the circulation fluid has been escaping.

The material may also be advantageously used in performing cementing operations where it is desired to introduce into the well a cement slurry and subject the slurry to an expansive pressure generated by the expanding bentonite clay. Under such circumstances, it is desirable to postpone or defer the application of the expanding pressure until the cement slurry has been properly positioned in the well and is commencing to set.

With the foregoing and other objects in view, which will be made manifest in the following detailed description and specifically pointed out in the appended claims, reference is had to the accompanying drawing for an illustrative embodiment of the invention, wherein:

Figure 1:
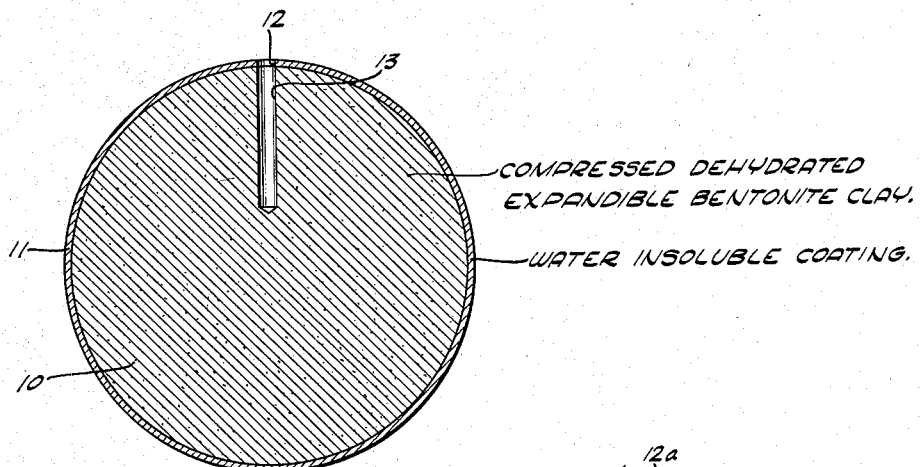
Figure 1 is a diametrical section through one form of granule or pellet embodying the present invention.

Referring to the accompanying drawing, and particularly to Fig. 1, the form of construction illustrated therein consists of a granule or pellet, generally indicated at 10, either composed entirely of or containing substantial amounts of compressed, dried, or dehydrated, expandable bentonite clay. This clay is preferably, but not necessarily, in a highly compacted and compressed condition having been subjected to a pressure of approximately 2000 pounds per square inch or more. If the pellet is not entirely composed of bentonite clay it contains bentonite clay as a substantial ingredient. In this event it may contain other inert filling or clogging materials, the exact nature of which is immaterial insofar as the present invention is concerned. The pellet has been illustrated as being largely spherical in form, but the particular shape may also vary considerably and is likewise immaterial insofar as the present invention is concerned.

The pellet is coated with a coating 11 which is of a water insoluble character. As the temperatures in the bottoms of deep wells may be relatively high, that is higher than the boiling point of water at atmospheric pressure, the coating 11 is also preferably of a thermo-setting character so that it will not soften or become plastic under the temperature conditions encountered in deep wells. The particular nature of the water insoluble coating may vary considerably. Urea formaldehyde adhesives are suitable for this purpose in that they are thermo-setting and are water resistant. These adhesives may be sprayed onto the pellets or the pellets may be otherwise coated therewith and thereafter the pellets may be subjected to the required temperature that will cause them to set or cure. Other synthetic resins which are water resistant and which will not soften under the temperatures encountered in wells may be used in lieu thereof. Such resins frequently are soluble in volatile solvents and may be applied in the form of solutions after which the solvents evaporate away, leaving the resins enclosing the pellet and forming a water resistant and temperature resistant coating.

Examples of the coatings that are suitable are as follows:

(1) *Cellulose acetate.*—Cellulose acetate having in the neighborhood of 60% combined acetic acid, such as type TH–4 or TH–5 distributed by Hercules Powder Company, can be dissolved in a solvent composed of methylene chloride and ethyl alcohol. Suitable proportions are in the ratio of 100 grs. cellulose acetate dissolved in 1750 cc. of solvent. In the solvent the proportion of methylene chloride to ethyl alcohol is 90% methylene chloride and 10% ethyl alcohol. Other solvents such as acetone, ethanol, and the like may be used in lieu of the solvent mentioned.

The pellets may be coated either by spraying, dipping, or the like, and several successive coatings can be applied to each pellet, each coating being allowed to dry before the application of the succeeding coat. Such a coating has a melting range of between 235° and 270° C.

(2) *Urea formaldehyde.*—Urea formaldehyde may be dissolved in distilled water in the proportion of 140 grams of urea formaldehyde to 900 cc. of distilled water. A hardener is then prepared by dissolving in 100 cc. of distilled water 1½ grams of ammonium chloride and 1½ grams of ammonium sulphate. This hardener can then be added to the urea formaldehyde solution and mixed thoroughly therewith. It is then ready for use.

The pellets can be sprayed, dipped, or the coating otherwise applied one on top of the other, each coating being allowed to dry at 100° to 200° F. before the application of a succeeding coating.

When the water is dried out or evaporated from the solution of urea formaldehyde, ammonium chloride and ammonium sulphate, an insoluble and water resistant film is left on the pellet.

(3) *Urac resin.*—The urea formaldehyde known as Urac Resin #110 manufactured and sold by the American Cyanamid Company may have hardener consisting of water and ammonium sulphate and ammonium chloride as above described added thereto after it has been dissolved in water as above described.

The coatings may be applied in the same manner.

Urac Resin #180, and Cyacor Resins #151 and #191 manufactured and sold by American Cyanamid Company may also be used in lieu of all or part of the Urac resin #110.

(4) *Polystyrene.*—Polystyrene, the product manufactured and sold by Dow Chemical Company known as Styron may be employed. I prefer to use their Styron #475 for use in relatively cold wells, that is, those wells whose bottom hole temperature is below 200° F. 50 grams of Styron dissolved in 1000 cc. of methylene chloride or carbon tetrachloride, either of which may be used as a solvent may be employed. The coatings may be applied by spraying or dipping.

The coating can be naturally or artificially dried and when the solvent is evaporated off an insoluble water resistant film is left deposited on the pellet.

(5) *Nitrocellulose.*—Nitrocellulose may be dissolved in a solvent such as a mixture of butyl acetate, toluene, ethyl alcohol and butanol. These ingredients may be mixed together in the proportions of about 30 cc. butyl acetate; 50 cc. toluene; 8 cc. ethyl alcohol; 4 cc. butanol. To this solvent nitrocellulose may be added in the proportions of about 15 grams. This coating may be applied either by spraying or dipping, and successive coatings may be applied one on top of the other. This coating has a useful temperature up to about 160° F.

Other coatings which are water insoluble and which will resist softening under heat of the temperature apt to be encountered in the well may be used in lieu of any of the coatings above-mentioned.

The coating shown in Fig. 1 prevents ingress of water to the bentonite clay except through a small entrance indicated at 12. This entrance may be formed by puncturing or drilling a hole 13 into the body of the pellet. The entrance 12 and the hole 13 are preferably of a very small size so small that, while water may be forced therein under pressure, water will not readily enter particularly against any air that may be entrapped in the hole.

When pellets of this character are used for recovering lost circulation in drilling wells they may be fed into the stream of circulation fluid that is being pumped down the drill stem. The circulation fluid will of course contain water to some extent. The water in the circulation fluid is prevented from gaining access to the bentonite clay enclosed within the coating 11 except through the small entrance 12. As the pellets proceed down the drill stem the hydrostatic pressure effective thereon continually increases so that eventually water is forced into the hole 13 and contacts the bentonite clay exposed on the walls. This contact of the water with the bentonite clay exposed on the walls of the hole 13 may commence as soon as the pellets are introduced into the circulation fluid or this contact may be delayed until the hydrostatic pressure is sufficient to force the water therein. The exposed bentonite clay will, of course, begin to absorb water when water is available in the hole 13. This portion of the clay consequently begins to expand and as its expansion continues eventually an internal pressure is developed, such as to rupture the pellet and rupture the coating 11 exposing more of the bentonite clay for water absorption and expansion. The rupturing of the pellet, however, is delayed for a considerable period of time which is great enough to afford an adequate opportunity for the pellet to be carried to the location where circulation fluid is being lost. The actual rupture may take place slightly in advance of the time that the pellet actually becomes lodged in place but usually this occurs after the pellet has become lodged. Consequently, the portions of the ruptured pellet will continue to absorb water from the circulation fluid and continue to expand after they have become lodged in place, thus locking the bentonite clay in position so that it cannot be dislodged.

Figure 2:
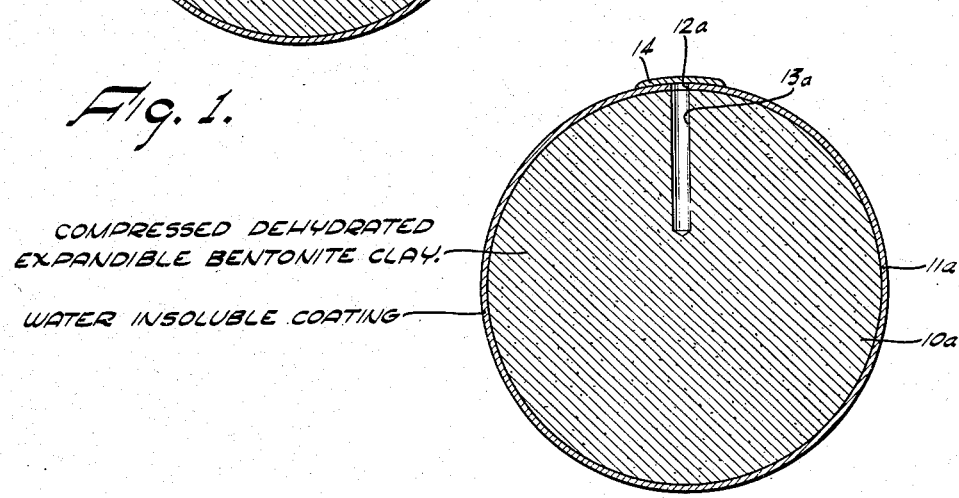
Fig. 2 is a similar view showing an alternative form of construction.

In the construction shown in Fig. 2, the entrance 12a to the hole 13a in the pellet 10a is shown as having been closed by a thin film 14 which entraps air in the hole 13a. This film may be of any desired material, either water soluble or water insoluble, thermo-plastic or thermo-setting. Its function is to merely form a yieldable closure closing the entrance 12a over the entrapped air in the hole. When the pellet shown in Fig. 2 is carried by the circulation fluid to a depth where the hydrostatic pressure is sufficient to rupture the film 14, this film gives way and permits water to enter the hole 13a. The bentonite clay then begins to absorb water and to expand and ultimately this expansion would cause the pellet to rupture, exposing more of the bentonite clay which can then absorb water and expand in situ in cracks and crevices which are to be plugged. In other respects the construction of the pellet shown in Fig. 2 is substantially the same as that disclosed in Fig. 1.

Figure 3:
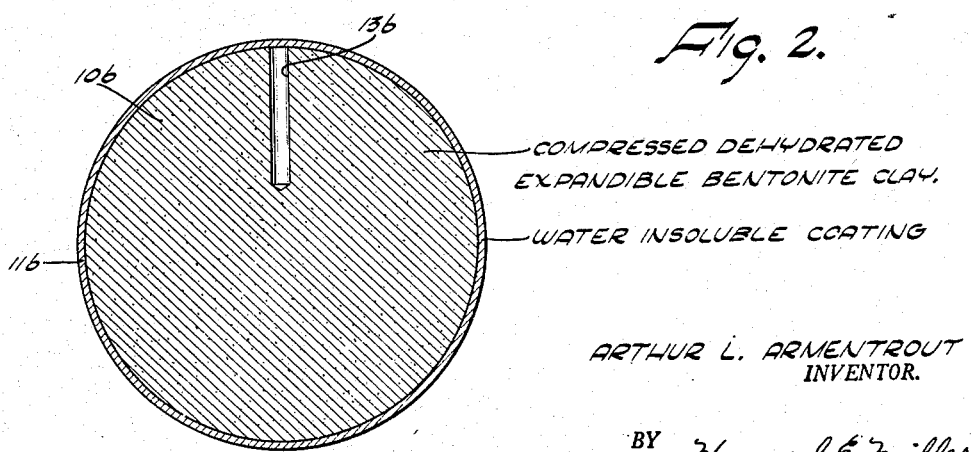
Fig. 3 is a similar view showing still another form of construction.

In Fig. 3, the construction of the pellet 10b is substantially the same as that disclosed in Fig. 1, except that the entrance to the hole 13b is closed by carrying the coating 11b thereover. This forms a temporary but yieldable barrier to the ingress of water into the hole 13b so that the pellet must be carried to a depth where the hydrostatic pressure is adequate to rupture that portion of the coating 11b overlying the hole 13b. When this occurs, water may enter the hole, be absorbed by the bentonite clay and cause the bentonite clay to expand and rupture the pellet. Thereafter, the portions of the ruptured pellet will continue to absorb water and expand in situ.

From the above-described constructions it will be appreciated that a material useful in recovering lost circulation in wells has been developed wherein the complete exposure of the bentonite clay to the water ingredient of the drilling mud may be postponed or delayed over a considerable length of time which will afford an opportunity for the pellet to be carried to the location where circulation fluid is being lost before the bentonite clay has been wetted and has lost its expansion properties. As the rupture and exposure takes place usually after the pellet has become lodged in place, the formation of a very tight seal is accomplished.

These pellets are also suitable in cementing operations and may be introduced into cement slurrys where delayed action causes their expansion to take place after the slurry has been positioned in the well and when the slurry is in a condition commencing to set. The pellets then rupture and create an expansive pressure forcing the slurry under high pressure against and into porous formations, cracks, and crevices in the well walls.

While sizes of the pellets, thicknesses of the coatings, and sizes of the holes in the pellets may vary, typical sizes are pellets ½" in diameter, having holes 1/16" in diameter, and approximately ¼" deep.

The term "dried or dehydrated" expandable bentonite clay as herein used does not necessarily refer to clay that has been deprived of all of its water. Such clay can of course be used but the commercially available bentonite clay which is suitable for use herein frequently contains as much as from 5 to 10% water. This clay although it does contain some water is nevertheless capable of absorbing much more water and expanding many times its initial volume.

The coating employed herein should not only be water repellant but of a type that will not be readily absorbed by the bentonite clay and rendering the clay inactive. Instead, the coating should remain on the surface of the pellet in the form of a more or less distinct layer which is relatively inelastic so that on expansion of the bentonite clay therein the coating will not merely stretch but will fracture or rupture exposing additional clay.

The invention is also suitable for introducing quick-setting cements and plasters into wells. These may be employed in lieu of the bentonite clay if they are of such a character that will expand on being wetted. If they do not possess this property sufficient bentonite clay may be mixed therewith to produce an expansion of the pellet at the bottom of the well and a consequent rupturing of the coating.

Various changes may be made in the details of construction without departing from the spirit and scope of the invention as defined by the appended claims.

I claim:

1. As a new article of manufacture, a pellet containing compressed, dehydrated, expandable bentonite clay coated with a water insoluble coating which is impervious to the ingress of water except at a restricted entrance, whereby the pellet may be introduced into a water containing mixture, pumped into a well, and ingress of water to the clay within the coating to an extent which will cause the clay to expand and rupture the pellet will be delayed until the pellet has had an adequate opportunity to be carried by the mixture to the desired locality after which the clay may absorb water, swell, and rupture the pellet exposing more of the clay to water absorption and swelling.

2. As a new article of manufacture, a pellet containing dehydrated, expandable bentonite clay coated with a water insoluble coating which is impervious to the ingress of water, there being a narrow hole extending into the interior of the pellet through the coating providing for limited ingress of water to the interior of the pellet.

3. As a new article of manufacture, a pellet containing dehydrated, expandable bentonite clay coated with a water insoluble coating which is impervious to the ingress of water, there being a narrow hole extending into the interior of the pellet through the coating providing for limited ingress of water to the interior of the pellet, and means closing the entrance to the hole.

4. A material for use in recovering lost circulation in drilling wells comprising a pellet of dehydrated, expandable bentonite clay almost entirely coated with a water insoluble coating which is impervious to the ingress of water.

5. A material for use in recovering lost circulation in drilling wells comprising a pellet of dehydrated, expandable bentonite clay almost entirely coated with a water insoluble coating which is impervious to the ingress of water, and means providing for the ingress of water to the interior of the pellet only after a predetermined hydrostatic pressure has been exerted on the pellet.

6. A material useful in recovering lost circulation in drilling wells comprising a pellet of compressed, dehydrated, expandable bentonite clay covered principally with a water insoluble coating which is impervious to the ingress of water and which is of a thermo-setting character.

7. A material adapted to be introduced into a well comprising a pellet of material which will expand on being wetted, and a water resistant coating coating the major portion of the pellet and providing an impervious covering for the pellet except at a small entrance where ingress of water may be effected.

References Cited in the file of this patent

UNITED STATES PATENTS

| | | |
|---|---|---|
| 2,626,779 | Armentrout | Jan. 27, 1953 |
| 2,642,268 | Armentrout | June 16, 1953 |
| 2,648,522 | Armentrout | Aug. 11, 1953 |